US005831638A

United States Patent [19]

West et al.

[11] Patent Number: 5,831,638

[45] Date of Patent: Nov. 3, 1998

[54] GRAPHICS DISPLAY SYSTEM AND METHOD FOR PROVIDING INTERNALLY TIMED TIME-VARYING PROPERTIES OF DISPLAY ATTRIBUTES

[75] Inventors: Roderick Michael Peters West, Colchester; Edward Kelley Evans, Essex Junction, both of Vt.

[73] Assignee: International Business Machines Corporation, Armonk, N.Y.

[21] Appl. No.: 612,704

[22] Filed: Mar. 8, 1996

[51] Int. Cl.$^6$ .............................. G06F 15/00; G06T 1/00

[52] U.S. Cl. .......................... 345/501; 345/509; 345/515; 345/203; 348/51; 348/593

[58] Field of Search .................................... 395/119, 120, 395/126, 132, 501–503, 507–510, 515; 348/42, 51, 55, 57, 58, 593–596; 345/114, 115, 185–190, 203, 501, 503, 507–510, 515, 186, 188

[56] References Cited

U.S. PATENT DOCUMENTS

| | | | |
|---|---|---|---|
| 3,989,889 | 11/1976 | Mendrala | 348/595 |
| 4,223,351 | 9/1980 | Tsujimura et al. | 348/595 |
| 4,393,400 | 7/1983 | Ikushima et al. | 348/56 |
| 4,668,989 | 5/1987 | Mackereth | 348/597 |
| 4,679,038 | 7/1987 | Bantz et al. | 345/200 |
| 4,700,181 | 10/1987 | Maine et al. | 345/201 |
| 4,723,159 | 2/1988 | Imsand | 348/50 |
| 4,851,901 | 7/1989 | Iwasaki | 348/42 |
| 5,091,717 | 2/1992 | Carrie et al. | 345/119 |
| 5,109,280 | 4/1992 | Karlock | 348/705 |
| 5,109,520 | 4/1992 | Knierim | 395/427 |
| 5,193,000 | 3/1993 | Lipton et al. | 348/43 |
| 5,241,624 | 8/1993 | Torres | 395/129 |
| 5,258,833 | 11/1993 | Schenk | 348/51 |
| 5,287,093 | 2/1994 | Amano et al. | 345/139 |
| 5,329,613 | 7/1994 | Brase et al. | 395/122 |
| 5,361,100 | 11/1994 | Teece | 348/578 |
| 5,367,632 | 11/1994 | Bowen et al. | 395/518 |
| 5,394,202 | 2/1995 | Deering | 353/7 |
| 5,396,263 | 3/1995 | Seiler | 345/115 |
| 5,412,479 | 5/1995 | Alig et al. | 348/594 |
| 5,416,509 | 5/1995 | Sombrowsky | 348/42 |
| 5,446,834 | 8/1995 | Deering | 395/127 |
| 5,502,462 | 3/1996 | Mical et al. | 345/185 |
| 5,649,173 | 7/1997 | Lentz | 395/513 |
| 5,654,749 | 8/1997 | Kanno | 348/56 |

FOREIGN PATENT DOCUMENTS

| | | | |
|---|---|---|---|
| 0282966 | 3/1988 | European Pat. Off. | G02B 27/22 |
| 0588522 | 8/1993 | European Pat. Off. | G06F 15/72 |
| 88/09103 | 11/1988 | France | H04N 13/04 |
| 8329259 | 6/1995 | Japan | G06F 15/72 |
| 2173667 | 10/1986 | United Kingdom | H04N 13/04 |

OTHER PUBLICATIONS

International Business Machines Technical Disclosure Bulletin vol. 31 No. 6 Nov. 1988, "Three–Dimensional Graphic Display", pp. 318–319.

Harrison, C.G., "Convenient Display of Three–Dimensional Medical Images With Easy Manipulation of the Image," IBM Technical Disclosure Bulletin, vol. 27, No. 7A, Dec. 1984, pp. 4026–4027.

*Primary Examiner*—Matthew M. Kim
*Assistant Examiner*—U. Chauhan
*Attorney, Agent, or Firm*—Eugene Shkurko; Brian F. Russell; Andrew J. Dillon

[57] ABSTRACT

A graphics display subsystem providing internally timed time-varying properties of display attributes is provided. The graphics display subsystem comprises a display device for displaying consecutive image frames of pixels having a variable display property, and a circuit for transferring image frames to the display device. One or more pixels are selected when a display attribute associated with the one or more pixels is set in an attribute table. The circuit varies, during a selected time interval, the display property of the selected pixels being displayed on the display device. In preferred embodiments, the variable display property is either a stereo image display, an image brightness control, or an image-blending control.

7 Claims, 8 Drawing Sheets

GRAPHICS DISPLAY SYSTEM AND METHOD FOR PROVIDING INTERNALLY TIMED TIME-VARYING PROPERTIES OF DISPLAY ATTRIBUTES

BACKGROUND OF THE INVENTION

1. Technical Field

The present invention relates in general to computer graphics systems and subsystems, and in particular to computer graphics subsystems having time-varying properties of display attributes. Still more particularly, the present invention relates to timing mechanisms for providing stereo display, brightness variation, or image blending in computer graphics systems and subsystems.

2. Description of the Related Art

In the field of Computer Graphics, a number of applications require the provision of stereo display capability. The stereo display provides the illusion of three-dimensional (3D) display from a two dimensional screen. In computer graphics, stereo display is generally used in such applications as molecular modelling, advanced CAD/CAM, architecture, and other applications, where stereo improves the understanding or visualization of a given problem set (Scientific Visualization). There is an emerging trend to use stereo display to provide so-called "Virtual Reality" to computer applications. While some of these applications are for Scientific Visualization, it is expected that the majority of the 3D and stereo applications will be for entertainment (games) and education. In order to realize the mass market potential of such applications, much commercial pressure is being applied to significantly improve the performance and reduce the complexity and cost of stereo display.

To create the illusion of three dimensional display from a two dimensional screen, a number of stereo techniques have been used in the prior art. All techniques seek to provide slightly different images, uniquely and independently, to each eye to mimic the natural stereo vision of the viewer. The prior art techniques are divided into those that provide separate images to the left and right eyes, either simultaneously or in succession. Those same techniques are applicable to most types of presentation medium, whether electronic (as with a computer CRT display) or optical (as with a movie screen). Computer displays, used in stereo 3D applications, are generally of the former category, presenting alternating frames uniquely to each eye from a single display screen. It is essential that the left eye does not perceive the frame intended for the right eye, and vice versa. This is achieved by fitting the user with goggles that block the view of the left eye when the frame intended for the right eye is displayed, and vice versa. Also, it is essential that the separate views provided to each eye be presented in a continuous succession of alternating display frames.

In computer graphics, an image to be displayed is divided into a number of discrete picture elements or pixels. Each pixel represents a physical position on the output display monitor and can have associated with it a color or specific shade of gray. In image and graphics systems, the pixels of a display are each represented by data stored in a memory device. This memory device storing this representation of a display is typically referred to as a frame buffer. A high resolution display, typically has an image of 1600×1280, or 2,048,000 pixels. Each pixel value can be represented by 1 to 32 or more bits, thus requiring a large amount of memory to store the image. This requirement for large amounts of high speed memory requires the use of high density memory devices, such as Dynamic Random Access Memories ("DRAMs").

The nature of video display scan patterns and update rates requires decoupling the updating of the frame buffer from the scanning out of the stored values (through video generation circuitry) for display on the video monitor. Consequently, a specialized form of DRAM memories, called Video RAMs (VRAMs), were developed for simultaneously displaying the contents of a graphics frame buffer to the screen, while allowing the graphics or image processor to update the frame buffer with new data. VRAMs contain two Input/Output ports (one for random access and one for serial access) and one address port. These memories are frequently referred to as dual-port memories.

Typically, stereo display is accomplished in computer graphics by utilizing "Double Buffer" techniques. Pixel display data being displayed as a double buffer is divided into two sub-pixel fields. These two fields are assigned as Buffer_A and Buffer_B. A "Buffer Select" signal provided by the system indicates which of the two buffers should be processed (according to other attributes) and displayed. By simply changing the Buffer Select signal, all double buffer pixels belonging to a double buffer application will immediately switch between Buffer_A and Buffer_B anywhere on the entire display. Alternatively and preferably, the palette DAC device can hold off the switch between Buffer A and Buffer_B until the start of the next display frame.

When performing stereo display, Buffer_A may contain the left eye image and Buffer_B may contain the right eye image. At the end of each display frame, the stereo application can switch between Buffer_A and Buffer_B before the next display frame begins. Also, before the next display frame begins, the stereo application must signal to the stereo vision system that display has switched between the left eye and right eye. It is vital that the buffer switch, and the signaling to the stereo vision system, be accurately timed to the frame blanking period, otherwise the stereo display effect would be completely destroyed. The visual effect of any such mis-timing would be considerably worse than any such mis-timing for double-bufferred computer animation applications. Therefore, for stereo display, it is essential that the separate views provided to each eye be presented on alternating display frames. These separate views must be presented in continuous succession at a very high frame rate because each eye only sees half of the frames. In order to keep display flicker to a minimum, each eye should receive at least 60 frames per second, leading to an overall frame rate of at least 120 frames per second.

The main problem for stereo display using Double Buffer techniques is the timing and accurate synchronization of the switch between buffers. Stereo display requires a very high display frame rate and also requires that the switching between buffers occurs every frame. This is in contrast to double-bufferred animation, where the frame rate is lower and buffer switching occurs every few frames without the need for absolute frame synchronization. Stereo applications are not only required to control the Buffer Select very accurately, they must also accurately signal left/right switching to the stereo vision system to allow left/right blocking of the eyes.

Applications that provide time-varying properties to the display, such as Stereo applications, are generally run in the central processing unit (CPU) of the computer system. To provide the highly synchronized control needed to properly control these properties, the CPU will have to monitor the state of frame blanking in the computer's graphics system, generally using a "polling" method (although some graphics systems can provide vertical blanking interrupts). The method of "polling" relies on the software running in a continuous loop, while continually reading a status register waiting for that status to change-this is very wasteful of CPU cycles. The moment frame blanking occurs, the CPU must update the Buffer Select signal-for example, in an appropriate Window Attribute Table entry-and then signal the stereo vision system that the left/right switch has occurred. The CPU must time these operations very accurately, taking into account latencies (and bottlenecks) to and from the graphics system and the stereo vision system. If the CPU is running a Real-Time OS (Operating System), then sufficiently accurate timing can be achieved, however most computers (particularly desktop computers) do not run using a Real-Time OS. As such, a stereo application running in the CPU is often subject to major interruptions, potentially being swapped out for large periods, so the likelihood of mis-timing the buffer switch is fairly high. The problem can be partially alleviated by fully occupying the CPU with the stereo application, locking out all other applications, but everything else on the computer would come to a grinding halt, including potentially the OS itself. Not only is this bad programming style, but it also could cause the computer to "hang" or lock out the user, and it would still not guarantee perfect timing and synchronization of the switching between buffers and signaling to the stereo vision system. Thus, because the buffer selection must be performed in real-time to maintain the stereo effect and because it consumes a large amount of CPU and system bus cycles, the performance of the computer system is significantly reduced.

SUMMARY OF THE INVENTION

A graphics display subsystem providing internally timed time-varying properties of display attributes is presented. The graphics display subsystem comprises a display device for displaying consecutive image frames of pixels having a variable display property, and a circuit for transferring image frames to the display device. One or more pixels are selected when a display attribute associated with the one or more pixels is set in an attribute table. The circuit varies, during a selected time interval, the display property of the selected pixels being displayed on the display device. In preferred embodiments, the variable display property is either a stereo image display, an image brightness control, or an image-blending control.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
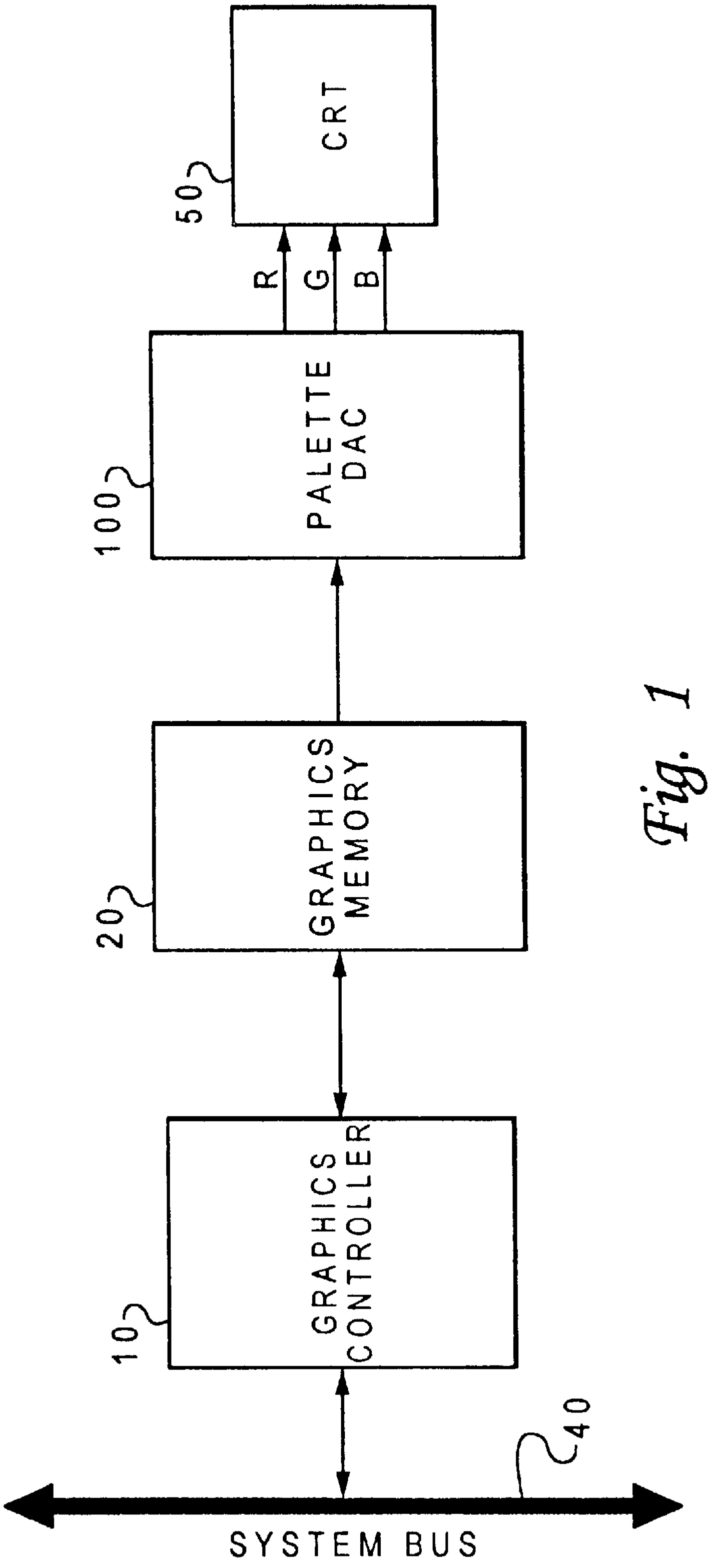
FIG. 1 shows a block diagram of a graphics display subsystem as used in a preferred embodiment of the present invention.

With reference now to the figures, and in particular with reference to FIG. 1, there is shown a block diagram of a graphics display system as used in a preferred embodiment of the present invention. The graphics display system includes graphics controller 10, graphics memory (VRAM) 20, graphics digital-to-analog converter (Palette DAC) 100, and display device 50. The Palette DAC is sometimes referred to as a "RAMDAC" or as a "LUT-DAC." System bus 40 connects the graphics display system to the rest of the computer system. Graphics controller 10 receives information to be displayed on a CRT display, including display pixel data, from a central processing unit or memory device (not shown) connected to the system bus 40. Graphics controller 10 transmits display pixel data, addressing information, and control signals to update graphics memory 20. Graphics memory 20 provides serial pixel data on a serial data bus to Palette DAC 100. Palette DAC 100 processes the received display pixel data and converts it into analog signals that drive the attached display device 50 (usually a CRT) for presentation as a visual image.

Figure 2:
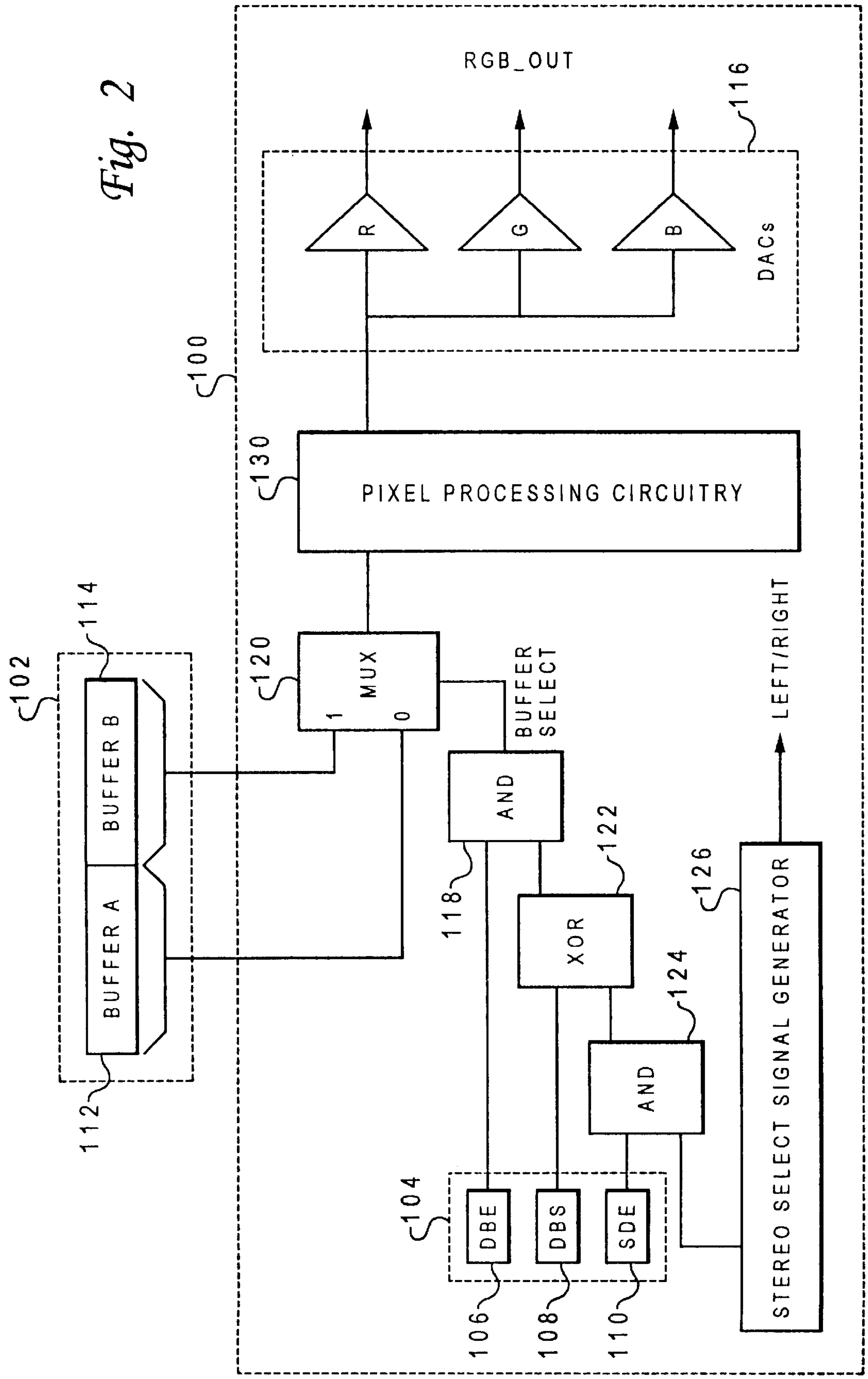
FIG. 2 shows a more detailed diagram of the palette DAC having an internally timed stereo display, in accordance with a preferred embodiment of the present invention.

Referring now to FIG. 2, there is shown a block diagram of palette DAC 100 having an internally timed stereo display, in accordance with a preferred embodiment of the present invention. Graphics memory 20 contains one or more image frames of stereoscopic display data, wherein each frame is comprised of a plurality of pixels and each pixel has two or more sub-pixel fields representing the multiple frame buffers for the frame. Palette DAC 100 receives a representative pixel 102 of the plurality of pixels from graphics memory 20 as part of a current image frame being displayed. As seen in FIG. 2, each pixel 102 is divided into a first sub-pixel field 112 (Buffer_A) and a second sub-pixel field 114 (Buffer_B), wherein one of the frame buffers, Buffer_A or Buffer_B, contains the left-eye frame buffer and the other frame buffer contains the right-eye frame buffer of the current image frame. Buffer_A and Buffer_B are provided to palette DAC 100 simultaneously. For example, a 32 bit pixel would be processed by palette DAC 100 as having two 16 bit sub-pixel fields, where one sub-pixel field is for the left eye frame and the other sub-pixel field is for the right eye frame for providing stereo display. When the palette DAC 100 is programmed for a double buffer application, the palette DAC operates on display pixel data using the double buffer pixel format by processing either the Buffer_A data or the Buffer_B data.

In general, workstation graphics, and in particular, multimedia workstation displays, provide a double buffer display capability. Double buffer display was originally devised to provide a seamless change between updated display frames. While one buffer is being displayed, the other buffer can be updated without any unwanted front-of-screen artifacts occurring. When the update of that buffer is completed, and just after the end of the current display frame, the buffer select can be switched, allowing the display of the newly updated buffer in the next frame. The process repeats itself in the next frame where the newly updated buffer is displayed and the other buffer is updated with data for display in a later frame. In this way, double buffer display provides a means whereby the actual update of the display data can be hidden from the viewer, allowing the results of that update to be brought to the display instantly once the update is complete.

In advanced workstation graphics, a window displaying a single buffer application and a second window showing a double buffer application may be displayed on the screen simultaneously. This is accomplished by transmitting two types of data for each pixel to the workstation's palette DAC (display digital-to-analog converter): a Window Identifier (WID) and the pixel display data. The WID is a pointer that identifies the window, the application, or the class of pixels to which the pixel belongs. The WID is used by the palette DAC to look up various attributes of that pixel class from a Window Attribute Table (WAT) residing in memory 104 of palette DAC 100. The attributes contained in the WAT define the format of the pixel data, the presence and number of display layers associated with that pixel data, how that pixel data is to be partitioned between the display layers, the type of processing to be applied to the pixel data of each display layer, and the criteria for determining which layer to display, among other features. These attributes of the various pixel classes are loaded into the Widow Attribute Table by the application software running on the workstation.

One of the attributes provided to the Window Attribute Table is used to distinguish between "double buffer" and "single buffer" applications. When the attributes from the WAT (for a given WID) indicate the presence of a double buffer application, the pixel display data having that WID is divided into two sub-pixel fields. These two fields are assigned as Buffer_A and Buffer_B. A further attribute (Double Buffer Select) from the WAT indicates which of the two buffers should be processed (according to other attributes) and displayed. By simply changing the Double Buffer Select attribute in the WAT for a given WID, all double buffer pixels belonging to a double buffer application having that same WID will immediately switch between Buffer_A and Buffer_B anywhere on the entire display. Alternatively and preferably, the palette DAC device can hold off the switch between Buffer A and Buffer_B until the start of the next display frame. Single buffer applications provide only one buffer of data to the palette DAC, and so do not provide a buffer select attribute or, alternatively, have that attribute constantly set to the buffer loaded with single buffer data (for example, Buffer_A).

As can be seen, such advanced graphics systems and workstations provide double buffer display capability on a per-window basis. However, the control provided is on a per-pixel basis. This allows applications to be displayed in windows of any arbitrary shape. Through the use of WIDs and the attributes they address in the WAT, double buffer display capability can be applied selectively to any window or set of windows, allowing double buffer applications and single buffer applications to be displayed simultaneously.

As shown in FIG. 2, during stereo display (and double buffer display), pixel 102 is divided into a first sub-pixel field 112 (Buffer_A) and a second sub-pixel field 114 (Buffer_B). As will be appreciated by those skilled in the art, each display pixel is comprised of the two sub-pixel fields 112, 114 contained in Buffer_A and Buffer_B, respectively. Thus, Buffer_A contains one eye's (the right eye, for example) image frame of display pixel data that is comprised of the sub-pixel fields 112 for every pixel in the image frame, and Buffer_B contains the other eye's (the left eye, for example) image frame of display pixel data comprised of the sub-pixel fields 114 for every pixel in the image frame. For example, a 16 bit-per-pixel stereo application would be loaded into the system's VRAM as a 32 bit-per-pixel application. A particular display frame (i.e. Buffer) is selected and the 16 bits in the selected sub-pixel field 112 or 114 is processed and converted by palette DAC 100.

As will be appreciated by those skilled in the art, memory device 20 is a high speed DRAM device such as a VRAM. During stereo display, pixel data stored in memory device 20 is logically divided into two logical frame buffers, Buffer_A and Buffer_B, each containing one of two sub-pixel fields for each pixel. Alternatively, each of the logical buffers may be stored in a physically separate memory device. It is intended that the present invention may be embodied in any type of memory configuration and that the present invention is not limited to the memory configuration of the preferred embodiment of the present invention.

As seen in FIG. 2, the buffer select circuit of the present invention generates a BUFFER_SELECT signal to select one of Buffer_A and Buffer_B to be accessed and its pixel data output to pixel processing circuitry 130 during the current image frame. Pixel processing circuitry 130 includes color lookup tables ("palettes"), gamma correction tables, color space conversion, direct color expansion and direct color bypass circuitry, all of which process the accessed pixel data in accordance with known techniques. The processed pixel data is thence output to RGB DACs 116 for conversion into the analog video signals (RGB_OUT) for driving a monitor display device, such as a CRT, or to the digital signals used to drive an LCD display.

Palette DAC 100 includes a memory or registers 104. Memory 104 comprises the WAT of the palette DAC device. Each entry of the WAT includes three attribute bits (as well as other attribute bits not shown) that control and select stereo display capability for a given class of pixels. That class of pixels can represent any given application window or set of application windows that can be displayed at any location on the screen. The three attribute bits applicable to stereo display are the Double Buffer Enable, the Double Buffer Select, and the Stereo Display Enable, which are stored in the Double Buffer Enable (DBE) register 106, Double Buffer Select (DBS) register 108, and Stereo Display Enable (SDE) register 110, respectively. Although separate registers are described in the preferred embodiment, all attributes can be stored as one or more bit attributes in a single register or memory in preferred embodiments. Also, in alternative embodiments, other attributes may be represented in the WAT. For example, in one alternative embodiment, a "Brightness" attribute is included. When the Brightness Attribute is set by the CPU, Palette DAC 100 can change the brightness level of the class of pixels associated with the set attribute over a given time interval. In this way, for instance, the display image of the given window can be made to slowly fade from the display. In another alternative embodiment, a "Blending" attribute is included in the WAT. When the Blending Attribute is set by the CPU, Palette DAC 100 combines pixel data from two separate image frames to create the displayed image. The percent of the displayed image derived from a given image frame starts at a predetermined level and increases or decreases over a given time interval. In this way, for example, a first image can be made to slowly "transform" into a second image on the display.

DBE register 106 contains the double buffer enable attribute, which enables both double buffer display or stereo display. DBS register 108 contains the double buffer select attribute, which selects the appropriate frame buffer for double buffer display and selects frame Buffer_A or frame Buffer_B as the right eye image frame for stereo display. SDE register 110 contains the stereo display enable attribute, which indicates whether the class of pixels for the associated window identifier (WID) are to be displayed as a stereo display. If the stereo display enable attribute is set, the frame buffers in graphics memory 20 are storing successive left and right eye image frames for the stereo display.

To enable palette DAC 100 to perform double buffer or stereo display, the double buffer enable bit in DBE register 106 must be set by the graphics application. Thus, when DBE equals 1, the pixel data is interpreted as having a double or stereo buffer, otherwise the pixel data is interpreted as a single buffer. When the DBE indicates the presence of a "Double Buffer," the Stereo Display Enable attribute indicates whether the pixel data in the buffer pair is a conventional double buffer or a "Stereo Double Buffer." If the pixel data is a Stereo Double Buffer, then the palette DAC 100 internally switches between frame buffers every frame blanking period. In this way, the palette DAC device has relieved the stereo application and the CPU from the task of switching buffers every frame blanking period.

In a preferred embodiment, frame Buffer_A would contain an image frame for one eye and frame Buffer_B would contain an image frame for the other. The stereo display application would designate which frame buffer contains the right eye image frame by setting the double buffer select attribute in DBS register 108. If Buffer_A contains the right eye image frame, DBS register 108 is be set, and if the right eye image frame is contained in Buffer_B, DBS register 108 is reset.

Stereo select signal generator 126 provides the sequencing for the stereo display. Stereo select signal generator 126 provides a bistable or a latch having an output state that alternates between 0 and 1, changing state in response to a frame blanking period of the display device (CRT 50). The stereo select signal switches to a first polarity during a first frame blanking period of the display device and to a second polarity during an adjacent frame blanking period of the display device. In a preferred embodiment, the 0 state is used to indicate a left-eye frame and the 1 state is used to indicate a right-eye frame. The stereo select signal generator 126 outputs the stereo select signal to ANDgate 124. The state of this bistable or latch is also provided as an output by palette DAC 100 to signal to the stereo vision system which frame (LEFT/RIGHT) is being displayed for the current image frame.

If the stereo display enable attribute is set in SDE register 110, the output of ANDgate 124 is coincident with the stereo select signal. This output is input to XORgate 122 along with the double buffer select attribute stored in DBS register 108. The output of XORgate 122 and the double buffer enable attribute stored in DBE register 106 are input to ANDgate 118. ANDgate 118 produces a BUFFER_SELECT signal that is used to control multiplexer (MUX) 120. A "0" Buffer Select Signal selects sub-pixel field 112 of a given pixel 102 and a "1" BUFFER_SELECT signal selects sub-pixel field 114 of a given pixel 102 as the output of multiplexer 120.

As will be appreciated by those skilled in the art, for every pixel of an image frame transferred to palette DAC 100 from graphics memory 20, the appropriate left or right eye sub-pixel field is selected by the generated BUFFER_SELECT signal controlling multiplexer 120. The appropriate sub-pixel field is selected for the entire image frame so that the entire left or right frame buffer is processed by pixel processing circuitry 130. The sequence of display frames is considered to be an alternating sequence of the two frame types designated left-eye and right-eye. For all pixel data that does not have the attributes of a stereo display, the same data is displayed in both left-eye and right-eye frames. If DBE equals 1, then DBS is used to indicate which buffer (frame Buffer_A or frame Buffer_B) contains the right-eye image frame. If DBE equals 1 and SDE equals 0, then the double buffers are of the conventional type for double buffer display with a choice of selected buffer depending entirely and statically on the value of DBS. If DBE equals 1 and SDE equals 1, then stereo display is enabled and the choice of selected buffers alternates between Buffer_A and Buffer_B every frame. If stereo display is enabled (SDE=1), Buffer_B is displayed in the left-eye frame and Buffer_A is displayed in the right-eye frame when DBS equals 1. A logic table for the above-described circuit of palette DAC 100 is shown in the TABLE. It is noted that when DBE equals 0, the pixel data is interpreted as a single buffer so that the entire pixel 102 would be processed by pixel processing circuitry 130 for every image frame.

TABLE

| DBE | SDE | DBS | RIGHT | BUFFER_SELECT |
|---|---|---|---|---|
| 0 | X | X | X | 0 => BUFFER_A |
| 1 | 0 | 0 | X | 0 => BUFFER_A |
| 1 | 0 | 1 | X | 1 => BUFFER_B |
| 1 | 1 | 0 | 0 | 0 => BUFFER_A |
| 1 | 1 | 0 | 1 | 1 => BUFFER_B |
| 1 | 1 | 1 | 0 | 1 => BUFFER_B |
| 1 | 1 | 1 | 1 | 0 => BUFFER_A |

As can be seen, it is trivially simple for the palette DAC of the present invention to achieve absolutely accurate synchronization of the switching between buffers with the frame blanking period, without any intervention from the CPU or the application software. At the end of each display frame, the stereo application will switch between Buffer_A and Buffer_B before the next display frame begins. It can be seen that the buffer switch, and the signaling to the stereo vision system, are accurately timed to the frame blanking period, preserving the stereo display effect. In this way, the separate views provided to each eye will be presented on alternating display frames. These separate views are presented in continuous succession at a very high frame rate because each eye only sees half of the frames. In order to keep display flicker to a minimum, each eye receives at least 60 frames per second, leading to an overall frame rate of at least 120 frames per second.

In order to further relieve the application and the CPU from the task of accurately timing the signal to the stereo vision system for switching the eye blanking in the user's goggles, palette DAC 100 provides an external output signal (LEFT/RIGHT) indicating whether a left-eye frame or a right-eye frame is currently being displayed, in the preferred embodiment of the present invention. Also, before the next display frame begins, the palette DAC will signal to the stereo vision system that display has switched between the left eye and right eye. It can be seen that, while control of stereo displays is provided on a per-pixel basis, the stereo display capabilities are provided on a per-window basis. This allows applications to be displayed in windows of any arbitrary shape. The stereo attribute can be applied selectively to any window or set of windows, allowing stereo applications and non-stereo applications to be displayed simultaneously (non-stereo applications are displayed with the same image in both right-eye and left-eye frames).

Figure 3:
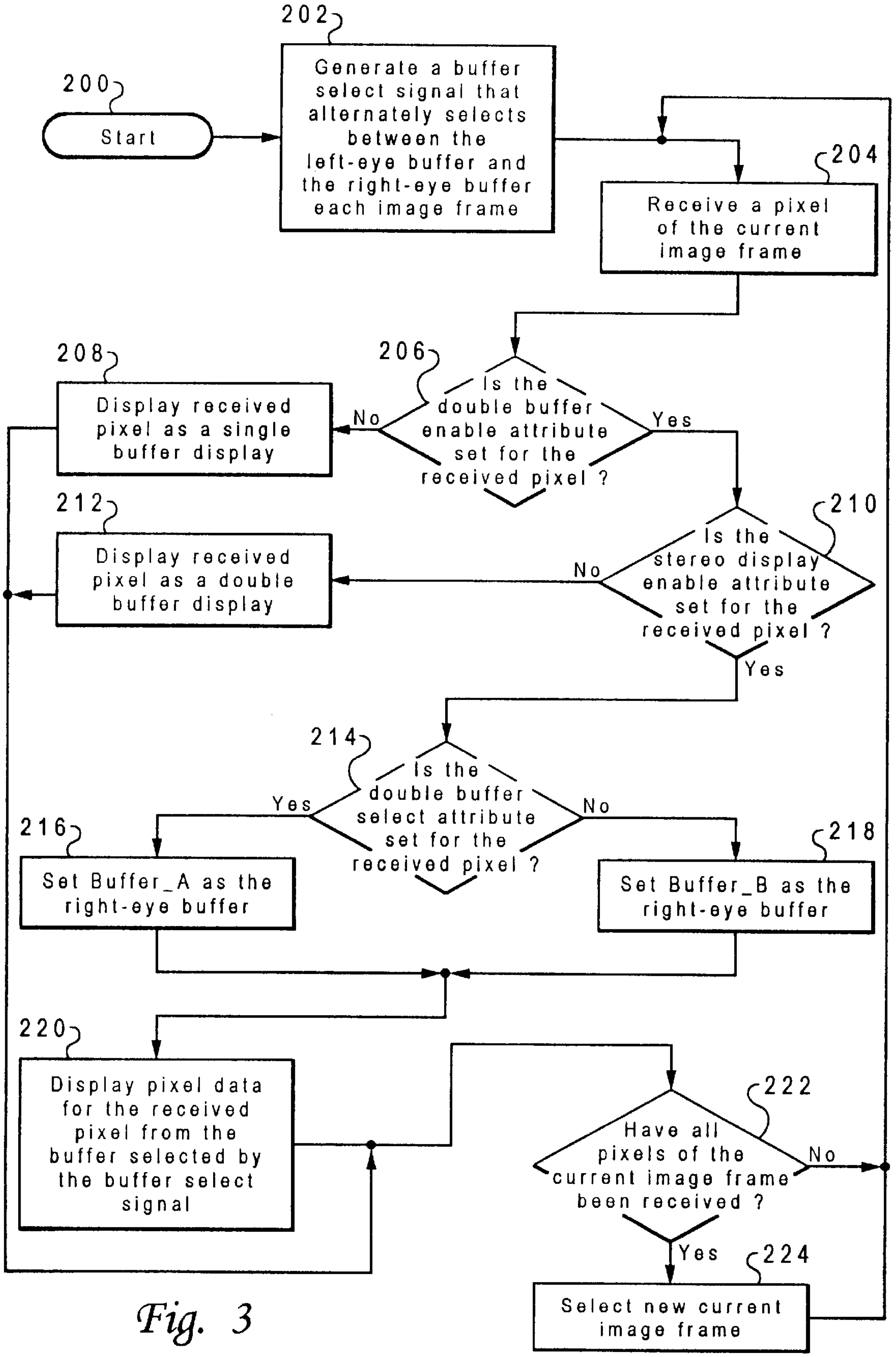
FIG. 3 shows a flow diagram of the method in a graphics display subsystem for providing an internally timed stereo display, in accordance with the preferred embodiment of the present invention.

Referring now to FIG. 3, there is shown a flow diagram of the method in a graphics display subsystem for providing an internally timed stereo display, in accordance with a preferred embodiment of the present invention. The process starts at step 200 when palette DAC 100 begins to receive a current image frame for display on the display device. At step 202, a Buffer Select Signal is generated that alternately selects between the left-eye buffer and the right-eye buffer each image frame. The Buffer Select Signal will select the left-eye buffer or the right-eye buffer, as selected by the Double Buffer Select attribute, during the current image frame, and then will select the other buffer during the next image frame, and then back to the original buffer during the next image frame, and so on, alternating back and forth between the left-eye buffer and the right-eye buffer with each new image frame. In this way, succeeding left-eye image frames and right-eye image frames are alternately presented to the user every other frame.

The process proceeds to step 204 where a pixel of the current image frame is received by palette DAC 100. The received pixel will have an associated WID, indicating the class of pixels to which the received pixel belongs. At decision block 206 it is determined if the Double Buffer Enable attribute is set for the received pixel, as indicated in the WAT for the received pixel's WID. If the Double Buffer Enable attribute is not set, the received pixel is displayed as a single buffer display, as shown at step 208. If the double buffer enable attribute is set, the process proceeds to decision block 210 where it is determined if the stereo display enable attribute is set for the received pixel, as indicated in the WAT for the received pixel's WID. If the stereo display enable attribute is not set, the received pixel is displayed as a double buffer display as shown at step 212. If the stereo display enable attribute is set for the received pixel, the process proceeds to decision block 214 where it is determined if the double buffer select attribute for the received pixel is set. If the double buffer select attribute is set, Buffer_A is set as the right-eye buffer, as shown at step 216. If the double buffer select attribute is not set for the received pixel, Buffer_B is set as the right-eye buffer, as shown at step 218.

Thereafter, the process proceeds to step 220 where the pixel data contained in the buffer selected by the buffer select signal is displayed. As has been seen, the buffer select signal will be selecting the left-eye buffer or the right-eye buffer for the current image frame as provided at step 202. Which sub-pixel field of the received pixel will be displayed for the current image frame is a function of this buffer select signal and of the double buffer select attribute, which designates which of the sub-pixel fields is the left-eye frame and which of the sub-pixel fields is the right-eye frame.

After displaying the selected sub-pixel field(s) for the received pixel at step 220, step 208, or step 212, the process of the present invention proceeds to decision block 222, where it is determined if all pixels of the current image frame have been received by palette DAC 100. If they have not, the process returns to step 204, where the next pixel of the current image frame is received and processed. If all pixels of the current image frame have been received and displayed, the process proceeds to step 224, where a new image frame is selected as the current image frame, and then returns to step 204, where the first pixel of the new current image frame is received by palette DAC 100. During the new current image frame, the buffer select signal has switched to select the opposite buffer from the previous frame. The process of the present invention is then repeated on the new current image frame.

Figure 4:
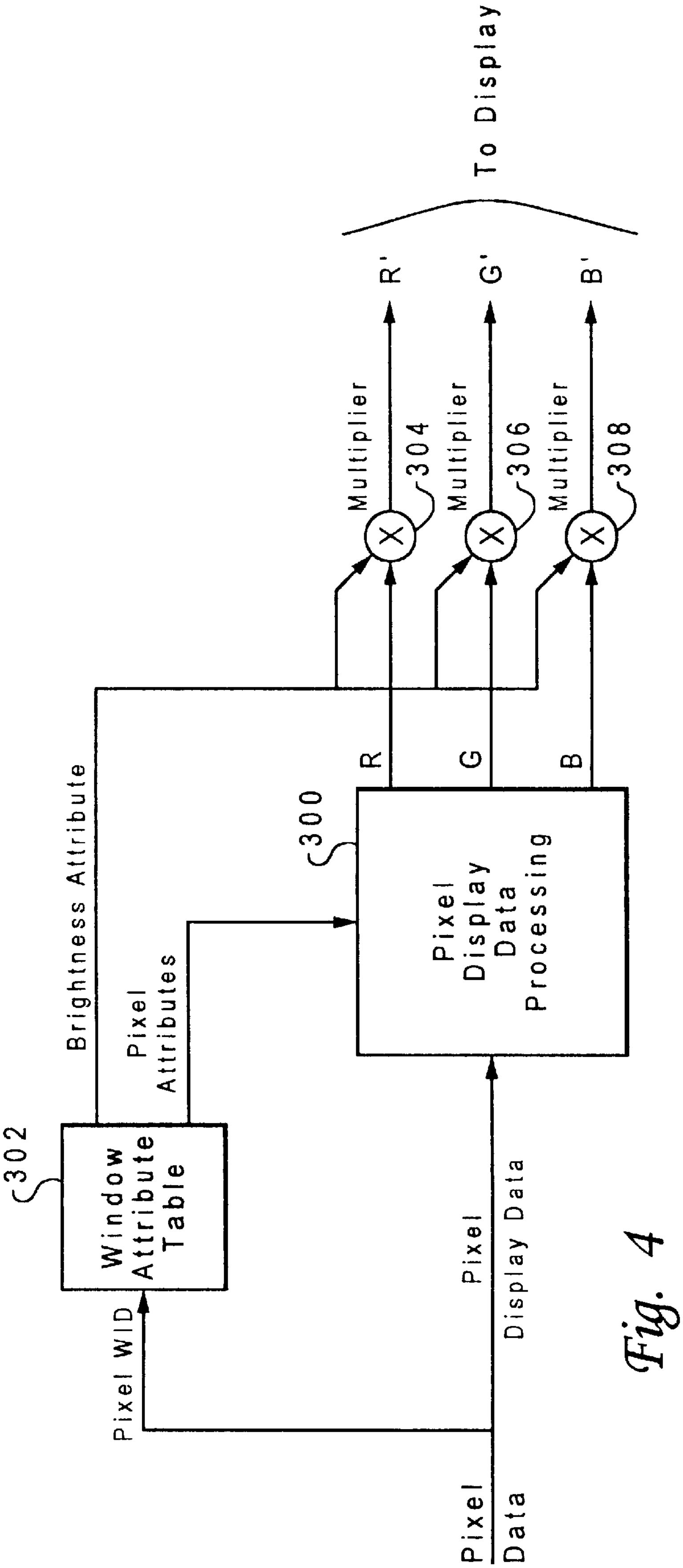
FIG. 4 shows a block diagram of the graphics display subsystem for providing internally timed brightness variation of graphics display image, in accordance with the preferred embodiment of the present invention.

In an alternative embodiment of the present invention, a Brightness Attribute is set in a register of memory 104 by the CPU, which lowers the brightness level of the displayed image frame over a given time interval. In this way, the display image slowly fades from the display. FIG. 4 shows a block diagram of the graphics display subsystem for providing internally timed brightness variation of a display image, in accordance with a preferred embodiment of the present invention. Pixel data is received at the from frame buffers in the palette DAC VRAM. The pixel data is divided into pixel display data, which is input to Pixel Display Data Processing circuitry 300, and the Pixel WID for each pixel, which is passed to the Window Attribute Table 302. Standard pixel attributes are sent to Pixel Display Data Processing 300 to direct window sizes, positions, overlays, etc. of the display image output. Window Attribute Table 302 also outputs a "Brightness Attribute" that is varied during an interval of time over any ascending or descending range between 0 and 1. The Brightness Attribute is multiplied together with the RGB signals output from Pixel Display Data Processing 300 at multipliers 304–308. This produces outputs R'G'B' to the display device that vary in brightness over the given time interval. Depending upon how the Brightness Attribute is controlled, as described herein below, the display image can be made to slowly fade in or fade out from the display.

Figure 5:
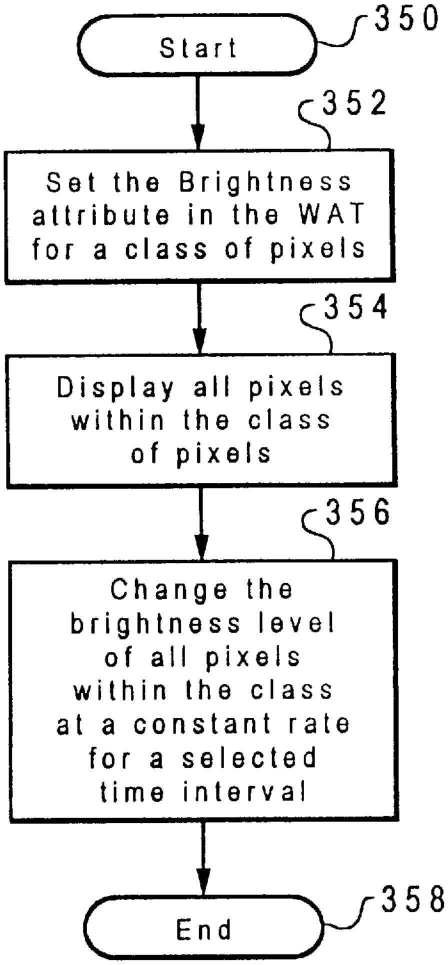
FIG. 5 shows a flow diagram of the method for providing internally timed brightness variation of a display image, in accordance with a preferred embodiment of the present invention.

With reference now to FIG. 5, there is shown a flow diagram of the method for providing internally timed brightness variation of a display image, in accordance with a preferred embodiment of the present invention. The process begins at step 350. At step 352, the Brightness Attribute for a pixel or class of pixels is set in the WAT by the graphics application executing in the CPU. The process then proceeds to step 354 where all pixels within the class of pixels having a Brightness Attribute set in the WAT are displayed, or continued to be displayed. The process then proceeds to step 356 where the brightness level of all pixels within the class of pixels having a brightness attribute set in the WAT is changed at a constant rate for a selected time interval. At the expiration of the selected time interval, the process ends at step 358.

In another alternative embodiment, a "Blending" attribute is included in the WAT. When the Blending Attribute is set by the CPU, Palette DAC 100 combines pixel data from two separate image frames to create the displayed image. The percent of the displayed image derived from a given image frame starts at a predetermined level and increases or decreases over a given time interval. In this way, for example, a first image can slowly "transform" into a second image on the display. An apparatus and method for implementing the blend function is described by the present inventors in co-pending application Ser. No. 08/466,569, which is assigned to the assignee of the present application.

Figure 6:
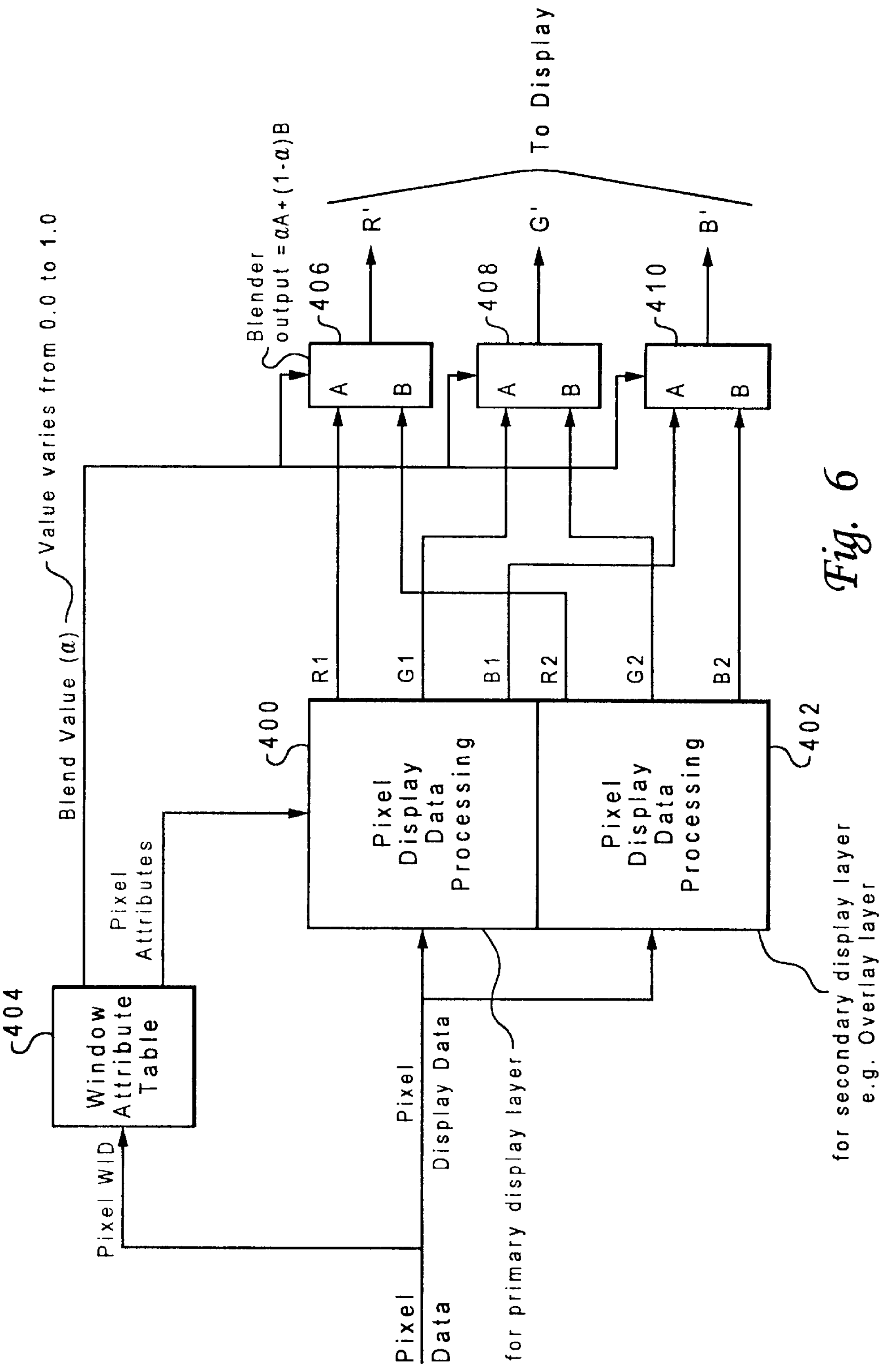
FIG. 6 shows a block diagram of the graphics display subsystem for providing an internally timed image-blending function, in accordance with the preferred embodiment of the present invention.

FIG. 6 shows a block diagram of the graphics display subsystem for providing an internally timed blending function, in accordance with a preferred embodiment of the present invention. Pixel data is received from the VRAM with pixel display data being directed to primary Pixel Display Data Processing 400 and secondary Pixel Display Data Processing 402. Pixel Display Data Processing 400 generates a primary display layer. Pixel Display Data Processing 402 generates a secondary display layer that may be used as an overlay layer, for example. The pixel WID for each pixel is passed to the Window Attribute Table 404. Standard pixel attributes are sent to the Pixel Display Data Processing units 400 and 402. Each of the primary-color outputs from Pixel Display Data Processing units 400, 402 are paired together and input into mixers 406, 408, 410, respectively. Thus, R1 and R2 are input into mixer 406 to produce R', G1 and G2 are input into mixer 408 to produce G', and B1 and B2 are input into mixer 410 to produce B'. Each mixer 406, 408, 410 is controlled by a Blend Value (α). The Blend Value varies over a given time interval from 0.0 to 1.0 or 1.0 to 0.0, for example, or over some smaller range within 0.0 to 1.0. The blended outputs produced by each of the mixers 406, 408, 410 is generated as a function of the Blend Value, following the equation: $\alpha A+(1-\alpha)B$, where α is the Blend Value and A is a first input of a given mixer and B is a second input for a given mixer. The blended outputs R'G'B' are output to the display device to generate the blended image. Over the selected time interval, the Blend Value is varied, as described herein below, so that the displayed image will start with the primary display image and slowly blend into the secondary display image, for example.

Figure 7:
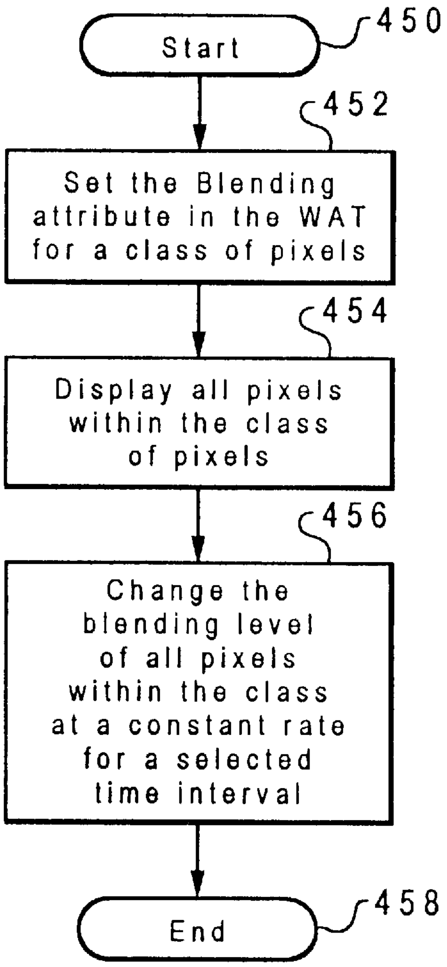
FIG. 7 shows a flow diagram of the method for providing internally timed image blending, in accordance with the preferred embodiment of the present invention.

With reference now to FIG. 7, there is shown a flow diagram of the method for providing internally timed image blending, in accordance with a preferred embodiment of the present invention. The process begins at step 450 and proceeds to step 452 where the blending attribute is set in the WAT for a class of pixels in the displayed image that are to be blended and "transformed" into a second image. The process then proceeds to step 454 where all pixels within the class of pixels having a set blending attribute are displayed or are continued to be displayed on the CRT. The process then proceeds to step 456 where the blending level of two separate image frames is changed over a selected time interval for all pixels having the blending attribute set. Following the expiration of the selected time interval, the process ends at step 458.

Figure 8:
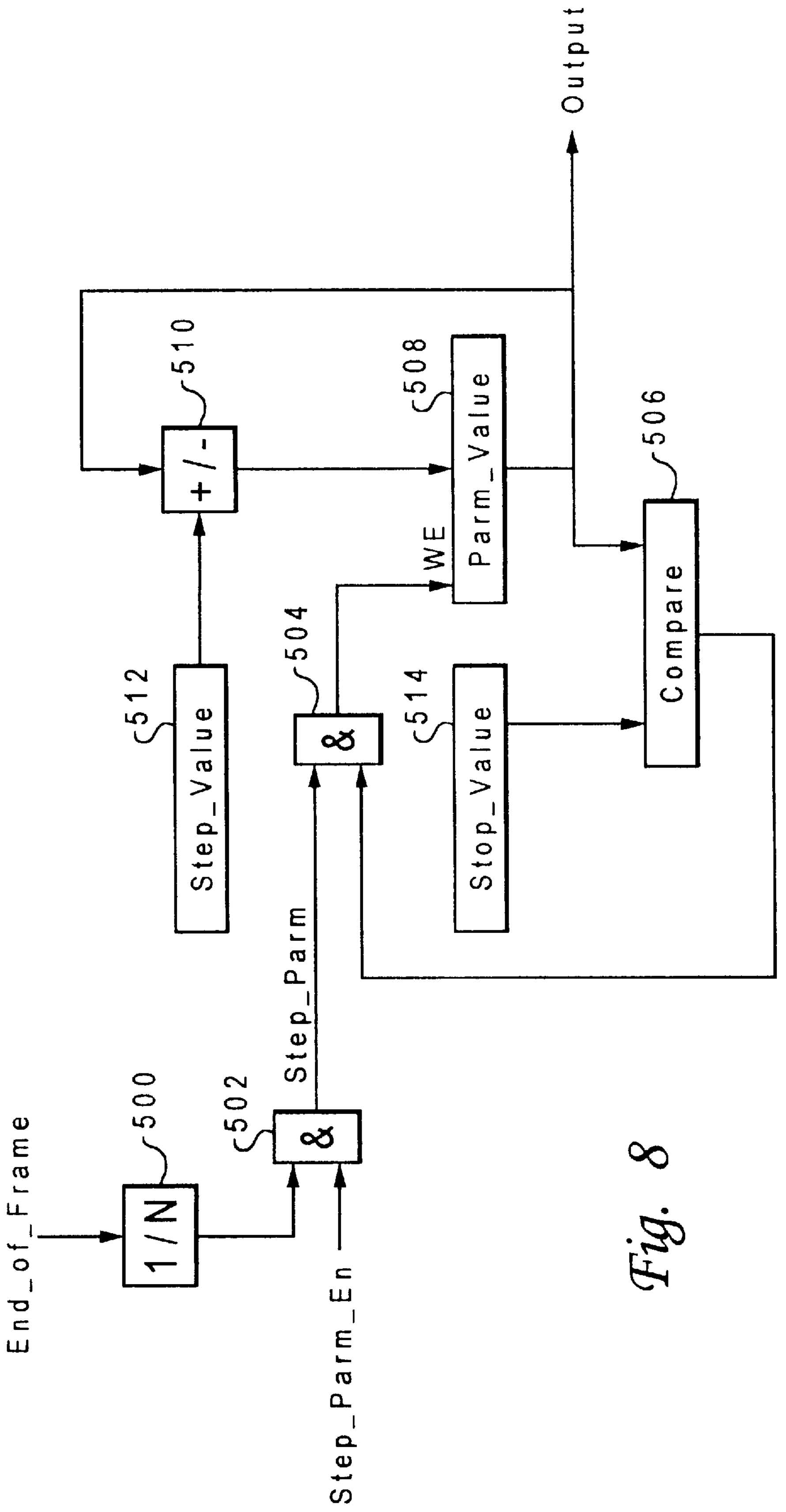
FIG. 8 shows a block diagram of the internally timed circuit for producing time-varying display attributes, in accordance with a preferred embodiment of the present invention.

With reference now to FIG. 8, there is shown a block diagram of the internally timed circuit for producing time-varying display attributes, in accordance with a preferred embodiment of the present invention. Signal-divider 500 receives an "End_Of_Frame" signal, indicating when each display frame has ended. Signal-divider 500 divides the incoming end-of-frame signals by N such that signal-divider 500 outputs a signal once every N frames, at the end of the Nth frame. The output of signal-divider 500 is input to ANDgate 502, along with "Step_Parm_En," which is set when a particular display attribute in the WAT is required to have a time varying property. This Step Parameter Enable signal is set when display attributes such as the blending or brightness attribute require a step variation in the output control of the display attribute from the Window Attribute Table 302, 404. The output of ANDgate 502 is the "Step_Parm" signal that is input into ANDgate 504 along with the output of comparator 506 (initially set). The output from ANDgate 504 is input into the Write-Enable pin of register 508. Register 508 contains a parameter value (Parm_Value) that acts as the output of this time-varying circuit. As will be appreciated, this parameter value may be the Brightness Attribute or the Blend Value. Register 508 can be implemented as a register within the Window Attribute Table or separately as an entry in a Variable Parameter Table of registers that is pointed to by an entry in the WAT. The parameter value is initially loaded into register 508 at the desired starting value. The output of register 508 is input into arithmetic unit 510 along with a step value (Step_Value) stored in register 512. The desired step value is also preloaded into register 512. Arithmetic unit 510 (set to either increment or decrement) increments or decrements the parameter value by the step value and loads the resultant parameter value in register 508 once every N frames, when a signal at the Write Enable pin of register 508 is received from ANDgate 504. The output of register 508 is also input into comparator 506 along with the output from register 514, which contains the intended stop value (Stop_Value) for the parameter value. This preselected stop value is also preloaded into register 514. When Parm-Value triggers the programmed comparison of comparator 506 (either equal to, greater than, or less than), the output of comparator 506 is reset, thereby disabling the output of ANDgate 504. At this point, at the end of this selected time interval, the changes in the parameter value ceases.

While the invention has been particularly shown and described with reference to a preferred embodiment, it will be understood by those skilled in the art that various changes in form and detail may be made therein without departing from the spirit and scope of the invention.

What is claimed is:

1. A graphics display subsystem having an internally timed stereo display, said graphics display subsystem comprising:

first and second buffer means for storing pixel data;

a display device for displaying consecutive image frames;

a memory for storing a plurality of attributes, said plurality of attributes including a stereo display enable attribute, a double buffer select attribute that defines the first buffer means as a right-eye buffer containing a right-eye image frame, and a double buffer enable attribute that enables and disables double buffer display and stereo display; and a circuit for transferring image frames to the display device, said circuit including:

a signal generator for outputting a stereo select signal, the stereo select signal switching to a first polarity during a first frame blanking period of the display device and to a second polarity during an adjacent frame blanking period of the display device;

a first ANDgate having the stereo select signal and the stereo enable signal as inputs;

an XORgate having the output of the first ANDgate and the double buffer select signal as inputs; and a second ANDgate having the output of the XORgate and the double buffer enable signal as inputs, the output of the second ANDgate indicating which of said first and second buffer means stores pixel data to be utilized for a current image frame;

wherein the circuit transfers pixel data from the first buffer means for display on the display device as a first image frame and transfers pixel data from the second buffer means for display on the display device as a second image frame, when the stereo display enable attribute within the graphics display subsystem is set.

2. A graphics display subsystem having an internally timed stereo display, said graphics display subsystem comprising:

a display device displaying image frames of pixels at a given frame rate, wherein each pixel of a given image frame belongs to a class of pixels;

a memory containing a plurality of attributes to be applied to a class of pixels, wherein the plurality of attributes includes a stereo display enable attribute indicating whether the class of pixels are to be displayed as a stereo display;

first and second buffer means for storing pixel data containing a first frame buffer and a second frame buffer, respectively;

a signal generator for outputting a stereo select signal, the stereo select signal switching to a first polarity during a first time interval and to a second polarity during an adjacent time interval; and a buffer select circuit for generating a buffer select signal that selects one of the first frame buffer and the second frame buffer for a given pixel of a given image frame if the stereo display enable attribute indicates the given pixel is to be displayed as a stereo display, wherein the buffer select circuit receives the stereo select signal and generates a buffer select signal selecting the first frame buffer if receiving the first polarity of the received stereo select signal and selecting the second frame buffer if receiving the second polarity of the received stereo select signal, wherein a selected frame buffer for a given pixel is output to the display device to be displayed as the given pixel for the given image frame.

3. A graphics display subsystem having an internally timed stereo display according to claim 2, wherein the plurality of attributes includes a double buffer select attribute, which defines a buffer as the first buffer, and a double buffer enable attribute, which enables double buffer display and stereo display, and wherein the buffer select circuit is enabled by the double buffer attribute.

4. A graphics display subsystem having an internally timed stereo display according to claim 3, wherein the buffer select circuit comprises a first ANDgate having the stereo select signal and the stereo enable signal as inputs, a XORgate having the output of the first ANDgate and the double buffer select signal as inputs, and a second ANDgate having the output of the XORgate and the double buffer enable signal as inputs, the output of the second ANDgate being the buffer select signal.

5. A graphics display subsystem having an internally timed stereo display according to claim 2, wherein the display device has a frame blanking period between image frames and wherein the stereo select signal switches between polarities during frame blanking periods.

6. A method in a graphics display subsystem for providing an internally timed stereo display, the method comprising:

setting a plurality of attributes for one or more pixels of an image frame to be displayed as a stereo display, said plurality of attributes including a stereo display enable attribute, a double buffer select attribute that defines one of a first buffer and a second buffer as a right-eye buffer containing a right-eye image frame, and a double buffer enable attribute that enables double buffer display and stereo display;

generating a stereo select signal that switches between a first polarity and a second polarity during adjacent frame blanking periods of a display device;

generating a buffer select signal that selects one of the first frame buffer and the second frame buffer for a given pixel of a given image frame if the stereo display enable attribute indicates the given pixel is to be displayed as a stereo display, wherein the buffer select circuit receives the stereo select signal and generates a buffer select signal selecting the first frame buffer if receiving the first polarity of the received stereo select signal and selecting the second frame buffer if receiving the second polarity of the received stereo select signal; and displaying, within the display device, pixel data from the buffer selected by the buffer select signal for every pixel of an image frame having a set stereo display enable attribute.

7. A method in a graphics display subsystem for providing an internally timed stereo display according to claim 6, wherein generating a buffer select signal includes switching the selection of a buffer during a frame blanking period of a display device displaying the image frame.

* * * * *